United States Patent
Carbonell et al.

(10) Patent No.: US 12,451,274 B2
(45) Date of Patent: Oct. 21, 2025

(54) BUSHING AND METHOD FOR PRODUCING A BUSHING

(71) Applicant: Hitachi Energy Ltd, Zürich (CH)

(72) Inventors: Mark Carbonell, Jackson, TN (US); Anders C. Johansson, Medina, TN (US)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 18/997,815

(22) PCT Filed: Jul. 14, 2023

(86) PCT No.: PCT/EP2023/069677
§ 371 (c)(1),
(2) Date: Jan. 23, 2025

(87) PCT Pub. No.: WO2024/028084
PCT Pub. Date: Feb. 8, 2024

(65) Prior Publication Data
US 2025/0266187 A1     Aug. 21, 2025

(30) Foreign Application Priority Data

Aug. 4, 2022   (EP) .................................... 22188697

(51) Int. Cl.
*H01B 17/28*   (2006.01)
*B23K 20/10*   (2006.01)
(Continued)

(52) U.S. Cl.
CPC ............. *H01B 17/28* (2013.01); *B23K 20/10* (2013.01); *H01B 19/00* (2013.01);
(Continued)

(58) Field of Classification Search
CPC ........ H01B 17/28; H01B 19/00; H01B 17/26; H01B 13/06; H01B 17/30; H01B 17/301;
(Continued)

(56) References Cited

U.S. PATENT DOCUMENTS 9,552,907 B2 *   1/2017   Emilsson ............... H01B 17/28
10,297,371 B2 *   5/2019   Lee ......................... H01B 17/28
(Continued)

FOREIGN PATENT DOCUMENTS

CN   108701951 A   10/2018
CN   112530638 A   3/2021
(Continued)

OTHER PUBLICATIONS

Extended European Search Report for European Patent Application No. 22188697.1, dated Jan. 19, 2023, 7 pages.
(Continued)

*Primary Examiner* — Angel R Estrada
(74) *Attorney, Agent, or Firm* — Sage Patent Group

(57) ABSTRACT

The bushing includes a plurality of electrically conductive elements and at least one ultrasonic welding joint. The at least one ultrasonic welding joint is formed between one electrically conductive element and another electrically conductive element and mechanically and electrically connects the electrically conductive elements with each other.

9 Claims, 4 Drawing Sheets

(51) Int. Cl.
*H01B 19/00* (2006.01)
*B23K 101/38* (2006.01)
*B23K 103/10* (2006.01)
*B23K 103/12* (2006.01)

(52) U.S. Cl.
CPC ...... *B23K 2101/38* (2018.08); *B23K 2103/10* (2018.08); *B23K 2103/12* (2018.08)

(58) Field of Classification Search
CPC .... H01B 17/303; H01B 17/56; H01B 17/583; H01B 17/60; H01B 7/28; B23K 20/10; B23K 2103/10; B23K 2103/12; B23K 2101/38; B29C 65/08; H01G 4/242; H02G 15/064; H02G 15/072; H02G 3/22; H02G 3/26; H02G 3/04; H02G 3/30; H02G 3/36; H02G 3/083; B21D 53/00
USPC ............ 174/143, 152 R, 142, 152 G, 153 G, 174/138 R, 139, 137 R, 5 R, 14 BH, 174/140 R, 262, 650; 439/371, 39; 336/137, 138; 16/2.1, 2.2
See application file for complete search history.

(56) References Cited

U.S. PATENT DOCUMENTS

| | | | | |
|---|---|---|---|---|
| 10,732,204 | B2* | 8/2020 | Wang | H01B 17/28 |
| 11,831,133 | B2* | 11/2023 | Hedlund | H01B 17/28 |
| 11,942,742 | B2* | 3/2024 | Edberg | H01R 4/42 |
| 12,159,732 | B2* | 12/2024 | Karstens | H05K 1/0296 |
| 12,261,421 | B2* | 3/2025 | Czyzewski | H02G 15/072 |

FOREIGN PATENT DOCUMENTS

| | | |
|---|---|---|
| CN | 113016040 A | 6/2021 |
| EP | 2806432 A1 | 11/2014 |
| EP | 3148027 A1 | 3/2017 |
| EP | 3869525 A1 | 8/2021 |
| GB | 2381650 A | 5/2003 |
| JP | 2019161039 A | 9/2019 |

OTHER PUBLICATIONS

International Search Report and Written Opinion of the International Searching Authority, PCT/EP2023/069677, mailed Sep. 28, 2023, 14 pages.
International Preliminary Report on Patentability of the International Preliminary Examining Authority, PCT/EP2023/069677, mailed Feb. 23, 2024, 16 pages.
Metge, Gerald et al., "Electroplating of Aluminum and Copper for Reliable Electrical Connections for Power Electronics," PCIM Europe digital days 2020, Jul. 7-8, 2020, 5 pages.
Krzanowski, James E., "A Transmission Electron Microscopy Study of Ultrasonic Wire Bonding," IEEE Transactions on Components, Hybrids, and Manufacturing Technology, vol. 13, No. 1, Mar. 1990, 6 pages.
Oberst, Marcella et al., "Impact of the Formation of Intermetallic Compounds in Current-Carrying Connections," IEEE Transactions on Device and Materials Reliability, vol. 20, No. 1, Mar. 2020, 10 pages.
Pfeifer, Stephanie et al., "Characterization of Intermetallic Compoungs in Al—Ag Bimetallic Interfaces," 27th International Conference on Electrical Contacts, Jun. 22-26, 2014, Dresden, Germany, 4 pages.
Furhmann, Torsten et al., "Comparison between nickel and silver as coating materials of conductors made of copper or aluminum used in electric power engineering," 27th International Conference on Electrical Contacts, Jun. 22-26, 2014, Dresden, Germany, 6 pages.
Murmson, Serm, "What Chemical Formula Do You Get When Mixing Copper & Aluminum?" Sciencing.com, Updated Apr. 25, 2017, 5 pages.
Chinese Office Action and Search Report, Chinese Patent Application No. 202380044147.8, mailed Apr. 28, 2025, 23 pages.

* cited by examiner

BUSHING AND METHOD FOR PRODUCING A BUSHING

CROSS REFERENCE TO RELATED APPLICATIONS

This application is a 35 U.S.C. § 371 national stage application of PCT International Application No. PCT/EP2023/069677 filed on Jul. 14, 2023, which in turn claims foreign priority to European Patent Application No. 22188697.1, filed on Aug. 4, 2022, the disclosures and content of which are incorporated by reference herein in their entirety.

TECHNICAL FIELD

The present disclosure relates to a bushing and a method for producing a bushing.

SUMMARY

There is a need for an improved bushing, for example for a bushing with reliable internal connections. Furthermore, there is a need for an improved method for producing such a bushing.

Embodiments of the disclosure relate to an improved bushing and an improved method for producing a bushing.

Firstly, the bushing is specified.

According to an embodiment, the bushing comprises a plurality of electrically conductive elements and at least one ultrasonic welding joint. The at least one ultrasonic welding joint is formed between one electrically conductive element and another electrically conductive element and mechanically and electrically connects the electrically conductive elements with each other.

An ultrasonic welding joint is herein understood to be a mechanically sound and electrically conductive joint formed by the fusing of two metals at conjoining surfaces which is at least partially formed by means of the application of vibrations in the ultrasonic bandwidth from an external energy source.

The bushing described herein is, for example, a high voltage bushing. Thus, it is configured to carry current at high electric potential from an active part of a first high voltage component such as a transformer, a generator or a cyclic break, through a barrier, like the grounded housing of the first component, to a second high voltage component, such as a high voltage overhead line or a high voltage cable termination. Such a high voltage bushing is used in switchgear installations (such as gas-insulated switchgear, GIS, or air-insulated switchgear, AIS), power or distribution transformers, or in high voltage rotating machines like generators. The high voltage bushing is, for example, configured for voltages ranging from a few kV up to several hundred kV and even above 1000 kV.

Internal joints of bushings, particularly of high voltage bushings, are known to cause bushing failure. Particularly in a high voltage bushing, ensuring low electrical impedance of the joint is critical to prevent high current transients from compromising the joint. Currently, there are several methods which are used for forming joints in a bushing, including solder and mechanical fasteners.

Soldering involves heating the conductive elements and using toxic flux and metals. It cannot be used effectively on any connection other than Cu-to-Cu joints.

Mechanical fasteners cannot be used on foils, for example, due to the large size of the fastener relative to the thickness of the foil, and protrusions of the fastener can cause partial electrical discharge if used in an electrically stressed area.

Using ultrasonic welding for the internal connection as suggested herein avoids the use of intermediate substances between the conductive elements. This reduces the risk of electrical failure. The electrical integrity of ultrasonic welding connections outperforms that of soldering, because no heating is needed of the conductive elements when using ultrasonic welding and, thus, it can be performed on conductive elements in close proximity to plastics, for example.

Ultrasonic welding involves high-frequency vibrations being transmitted into the conductive elements to be welded. The resulting surface friction causes diffusion of the material of one of the conductive elements into the other, thus forming a welded joint between the elements. An important advantage of ultrasonic welding is that the temperature of the conductive elements stays well below their melting temperatures. Therefore, ultrasonic welding can, in particular, be applied to foils which then do not melt or burn during the ultrasonic welding process, even if they are welded to elements with larger thermal mass.

The bushing specified herein may comprise several ultrasonic welding joints. All features disclosed herein for one ultrasonic welding joint are also disclosed for all other ultrasonic welding joints.

The ultrasonic welding joint is an internal joint of the bushing. For example, it is not visible from outside the bushing and/or is not accessible from outside the bushing.

The ultrasonic welding joint can also be referred to as ultrasonic welding connection or ultrasonic welding bond or ultrasonically fused joint/connection/bond. The ultrasonic welding joint is provided directly between the conductive elements which it firmly connects. Thus, there is no additional connection material between the two conductive elements, for example. The conductive elements may each be formed of metal or may comprise metal.

When investigating a joint between two elements, the skilled person is able to determine which joining method was used. Particularly, the skilled person is able to see whether two conductive elements were at least partially connected via ultrasonic welding. The primary identifying characteristic of an ultrasonically bonded joint is a lack of intermediate or foreign bonding materials, but rather an interface layer at the bond which comprises an alloy of the two metals being joined together. Further, features can be present on opposing external surfaces of the metals being joined that shall indicate the application of pressure with tooling in direct contact with the metal surface. These features, for example, take the form of a regular or irregular formation of indents of varying depth into the base metal.

According to a further embodiment, the bushing is a condenser bushing. It comprises an inner conductor for transporting current and at least two field grading layers formed of an electrically conductive material and arranged around the inner conductor. An electrically isolating material is arranged between the at least two field grading layers and electrically isolates them from each other.

The inner conductor is, for example, made of metal or comprises metal, like Cu or Al. The field grading layers are made of an electrically conducting material. For example, the field grading layers comprise or are made of metal, e.g. of a metal foil. They may comprise or consist of Al. Alternatively, the field grading layers can also comprise or can be made of a conductive ink that is impregnated into paper. The field grading layers are separated and electrically isolated from each other via an electrically isolating material and therefore constitute a condenser. The field grading layer closest to the inner conductor may be electrically connected to the inner conductor. The field grading layer furthest away from the inner conductor may be electrically connected to ground.

The inner conductor may be an elongated body, e.g. a rod, having a main extension axis. The field grading layers may radially surround the inner conductor. For example, they form concentrical, cylindrical shells around the inner conductor. The electrically isolating material is then radially arranged between each two field grading layers. The electrically isolating material may also be arranged between the inner conductor and the field grading layer closest to the inner conductor.

The electrically isolating material may comprise plastic and/or paper and/or oil and/or epoxy resin. For example, the electrically isolating material comprises a woven or non-woven fabric. This fabric may be embedded in an epoxy resin. For example, a stack of several layers made of isolating material is formed between each two adjacent field grading layers. The stacked layers may be formed of isolating tape wound around the inner conductor.

According to a further embodiment, the inner conductor and/or at least one field grading layer are mechanically and electrically connected to another electrically conductive element by means of at least one ultrasonic welding joint.

According to a further embodiment, the other conductive element is a metal braid, for example a copper (Cu) braid. The metal braid may be a flat braid or a round braid.

According to a further embodiment, a section of the metal braid adjoining the ultrasonic welding joint is a solidified section in which the threads of the braid are connected to each other in a material locking manner. Therefore, the threads in this area cannot be separated from each other without causing damage. For example, the threads are welded to each other, e.g. by means of resistance welding, and are therefore fused together in this section.

According to a further embodiment, the inner conductor is electrically connected to an inner field grading layer of the bushing via a first connection element, e.g. a first metal braid. Additionally or alternatively, an outer field grading layer of the bushing is electrically connected to a housing element of the bushing via a second connection element, e.g. a second metal braid. The first and the second metal braid may both be flat metal braids, e.g. Cu braids. Instead of metal braids, foil stripes could be used.

The inner field grading layer is herein the field grading layer closest to the inner conductor, e.g. the radially innermost field grading layer. The outer field grading layer is herein the field grading layer furthest away from the inner conductor, e.g. the radially outermost field grading layer. The housing element is, for example, a flange of the bushing. The flange is, for example, configured to be connected to the housing of a transformer. The housing element may radially surround the inner conductor and each of the field grading layers. For instance, the housing element is formed of an electrically conductive material, like metal.

According to a further embodiment, the inner conductor is mechanically and electrically connected to the first connection element, e.g. to a first end thereof, by means of at least one ultrasonic welding joint.

According to a further embodiment, the inner field grading layer is mechanically and electrically connected to the first connection element, e.g. to a second end thereof, by means of at least one ultrasonic welding joint.

According to a further embodiment, the outer field grading layer is mechanically and electrically connected to the second connection element, e.g. to a first end thereof, by means of at least one ultrasonic welding joint.

According to a further embodiment, the housing element is mechanically and electrically connected to the second connection element, e.g. to a second end thereof, by means of at least one ultrasonic welding joint.

According to a further embodiment, a field grading layer, e.g. the outer field grading layer or the field grading layer adjacent to the outer field grading layer is electrically connected to a voltage tap via a third connection element. The third connection element may comprise a (round) metal braid and/or a metal foil. The metal braid and the metal foil of the third connection element may be formed of Cu. The third connection element may be mechanically and electrically connected to the field grading layer by means of at least one ultrasonic welding joint. Furthermore, the third connection element may be mechanically and electrically connected to the voltage tap by means of at least one ultrasonic welding joint.

For example, the metal braid of the third connection element is mechanically and electrically connected to the voltage tap by means of an ultrasonic welding connection. The metal braid of the third connection element may be mechanically and electrically connected to the metal foil of the third connection element by means of soldering. The metal foil of the third connection element may be mechanically and electrically connected to the field grading layer by means of an ultrasonic welding joint.

According to a further embodiment, at least one ultrasonic welding joint is formed between and mechanically and electrically connects a conductive element made of Cu and/or Al and another conductive element made of Cu. For example, an ultrasonic welding joint within the bushing may be formed between one or more of:

solid Al and Cu foil,
solid Cu and Cu foil,
solid Cu and Al foil
Al foil and Al foil
Cu foil and Cu foil
solid Al and Cu braid,
solid Cu and Cu braid,
Cu braid and Al foil,
Cu braid and Cu foil,
Cu foil and Al foil.

Alternatively, at least one of the conductive elements connected to another conductive element by means of an ultrasonic welding joint comprises or consists of brass.

According to a further embodiment, at least one of the conductive elements which is firmly connected to another conductive element by means of at least one ultrasonic welding joint is a metal foil. A metal foil is herein understood as a foil having a thickness of at most 1 mm or at most 100 µm, for example.

According to a further embodiment, at least one of the conductive elements which is mechanically and electrically connected to another conductive element by means of at least one ultrasonic welding joint comprises a structure imprinted into the conductive element. The structure can be the imprint of a structure of a welding tool, like an anvil and/or a sonotrode/horn, of a welding apparatus used for the ultrasonic welding. For example, the structure is imprinted into a side of the conductive element facing away from the ultrasonic welding joint. The structure may overlap with the ultrasonic welding joint in top view of the conductive element.

For example, the structure comprises a plurality of regularly or irregularly arranged recesses and/or protrusions on the outer surface of the conductive elements, i.e. on the surface facing away from the ultrasonic welding joint. These structures are, for example, normal to the plane of the welding joint and appear on the surfaces of the conductive elements in direct contact with the tooling of the ultrasonic apparatus.

The depth and/or height of the structure into/out of the outer surface is dependent on the thickness and hardness of the conductive element as well as the size of the welding joint. The appearance of the structure may be a geometric pattern of alternating protrusions and/or recesses forming lines, squares, triangles, etc. Also, the appearance of the structure may be a random and irregular pattern of protrusions and/or recesses varying in size, shape, and depth/height.

The depth of each recess/protrusion and/or its extension parallel to the outer surface is, for example, at least 1 μm or at least 10 μm or at least 100 μm. Additionally or alternatively, the depth and/or lateral extensions of each recess may be at most 1 mm or at most 100 μm.

According to a further embodiment, the structure is a knurl structure.

It turned out that an ultrasonic welding joint formed with a structured welding tool and this structure being imprinted into at least one of the conductive elements has a lower impedance than an ultrasonic welding joint formed with a smooth welding tool, at least in some applications. For example, if one of the conductive elements is a metal foil, such a structure may be formed in the metal foil. In general, it turned out that an ultrasonic welding joint has a lower impedance than other joints, like solder joints.

Next, the method for producing a bushing is specified. The method may be used for producing a bushing as specified herein. Therefore, all features disclosed in connection with the bushing are also disclosed for the method and vice versa.

According to an embodiment, the method for producing a bushing comprises providing electrically conductive elements, i.e. two or more conductive elements. The method further comprises a step of ultrasonically welding one of the conductive elements to another one of the conductive elements. Thus, an ultrasonic welding joint is formed between the conductive element and the other conductive element which mechanically and electrically connects the conductive element with the other conductive element.

The ultrasonic welding may be done with the help of an ultrasonic welding apparatus. This may comprise at least one welding tool, e.g. a horn or sonotrode, respectively. Additionally, the ultrasonic welding apparatus may comprise an anvil. Also other methods or devices can be used to stabilize the welding joint during the welding process and provide reactionary pressure against the force of the welding tool.

For forming the ultrasonic welding joint, the conductive element and the other conductive element may be pressed against each other with the help of the welding tool. Then, ultrasonic acoustic vibrations are induced into the two conductive elements, e.g. via the welding tool. The material of one conductive element thereby diffuses into the material of the other conductive element so that a welding joint is formed.

The conductive element and the other conductive element may be sandwiched between the horn and the anvil and may be pressed together between these two elements. Alternatively, if the conductive element is mechanically stable, a separate anvil can be dismissed and the other conductive element can be sandwiched between the mechanically stable conductive element and the horn.

According to a further embodiment, the other conductive element is a metal braid, e.g. of Cu.

According to a further embodiment, before the ultrasonic welding, a section of the metal braid to be ultrasonically welded is solidified by connecting the threads of the metal braid in this section in a material locking manner. Connecting the threads may be done by welding, e.g. resistance welding. The threads are thereby fused together.

With this additional step, it can be prevented that individual threads project from the section of the metal braid which is to be ultrasonically welded. Such projecting threads could not be welded during the ultrasonic welding process and this may indeed increase the impedance of the ultrasonic welding joint.

According to a further embodiment, a welding tool is used for ultrasonically welding the conductive element to the other conductive element, said welding tool comprising a surface with a structure, i.e. a structured surface. For example, the horn and/or anvil comprises such a structured surface.

According to a further embodiment, for ultrasonically welding the conductive element to the other conductive element, the conductive element and the other conductive element are pressed together with the help of the welding tool so that the structure of the surface of the welding tool is imprinted into at least one of the conductive element and the other conductive element.

So far, several features have been disclosed in connection with producing one ultrasonic welding joint. These features are also disclosed for the production of all other ultrasonic welding joints of the bushing, if applicable.

Hereinafter, the bushing and the method for producing a bushing will be explained in more detail with reference to the drawings on the basis of exemplary embodiments. The accompanying figures are included to provide a further understanding. In the figures, elements of the same structure and/or functionality may be referenced by the same reference signs. It is to be understood that the embodiments shown in the figures are illustrative representations and are not necessarily drawn to scale. In so far as elements or components correspond to one another in terms of their function in different figures, the description thereof is not repeated for each of the following figures. For the sake of clarity, elements might not appear with corresponding reference symbols in all figures.

DETAILED DESCRIPTION

Figure 1:
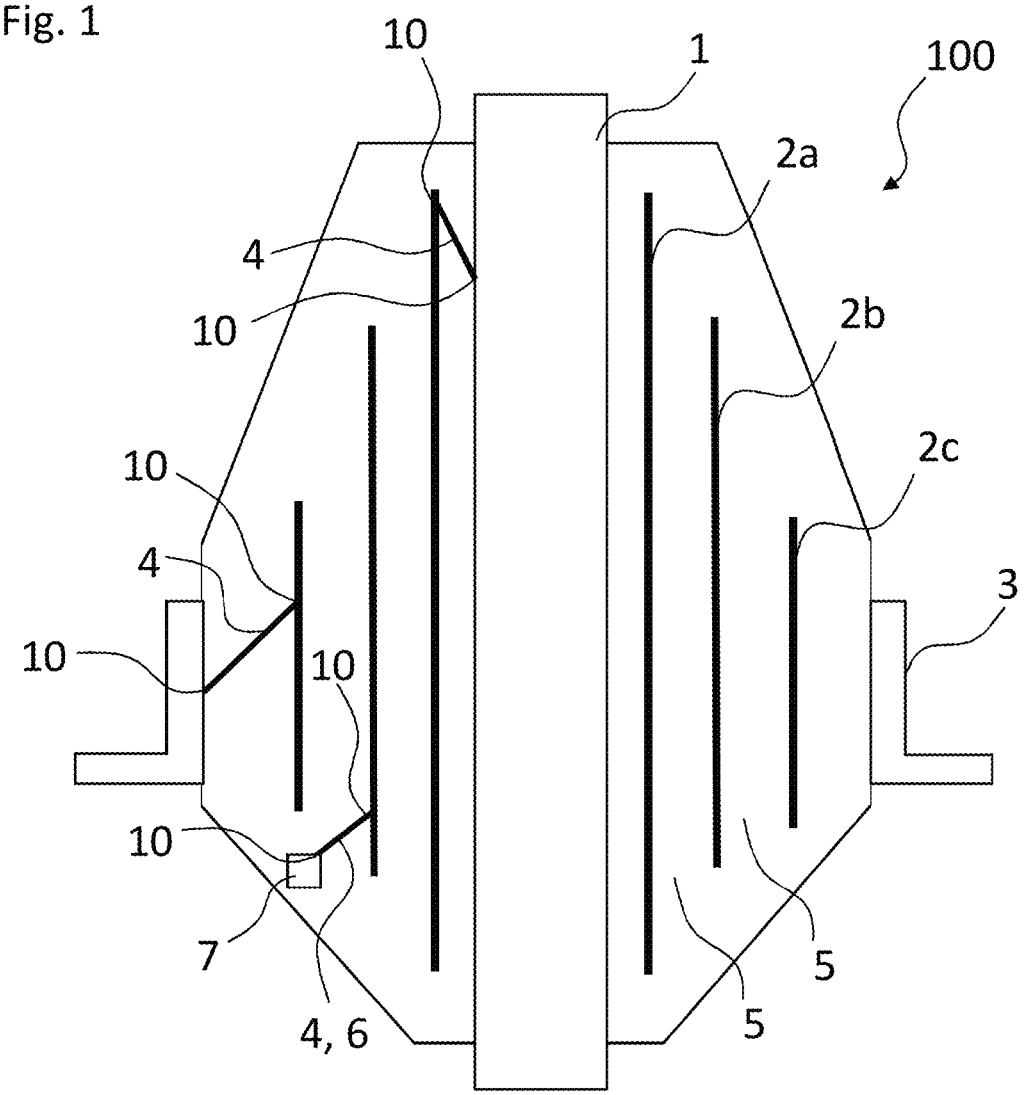
FIG. 1 shows an exemplary embodiment of a bushing in a cross-sectional view.

FIG. 1 shows an exemplary embodiment of a bushing in a cross-sectional view. The bushing 100 is a high voltage condenser bushing comprising a plurality of field grading layers 2a, 2b, 2c radially surrounding an inner conductor 1. The inner conductor 1 is, for example, a solid Cu or Al rod. The field grading layers 2a, 2b, 2c are, for example, Al foils, wound around the inner conductor 1 and forming coaxially arranged cylinder shells. An electrically isolating material 5 is arranged between each pair of adjacent field grading layers 2a, 2b, 2c and electrically isolates the adjacent field grading layers 2a, 2b, 2c from each other.

The electrically isolating material 5 may be formed, for example, of an electrically isolating tape wound around the inner conductor 1. One or several turns of the isolating tape may be arranged between each pair of adjacent field grading layers 2a, 2b, 2c. The electrically isolating tape may comprise a fabric of plastic.

The bushing 100 further comprises a housing element 3 in the form of a flange. This flange 3 may be grounded and may be configured to be connected to the housing of a transformer, for example. Thus, a voltage difference appears between the inner conductor 1 and the flange 3 during operation. The field grading layers 2a, 2b, 2c are configured to homogenize the electric field between the inner conductor 1 and the housing of the bushing 100.

The inner conductor 1 is electrically connected to the inner field grading layer 2a via a first connection element 4. The outer field grading layer 2c is electrically connected to the flange 3 via a second connection element 4. Moreover, the intermediate field grading layer 2b is electrically connected to a voltage tap 7 via a third connection element 4, 6.

Figure 2:
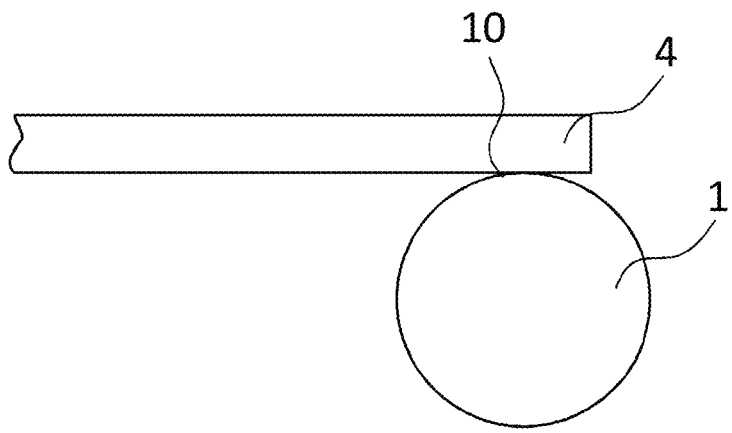
FIGS. 2 to 7 show different parts of the bushing of FIG. 1 in an enlarged view.

FIG. 2 shows a detailed view of the connection between the inner conductor 1 and the first connection element 4 in a side view. The first connection element 4 is, for example, a flat Cu braid. An ultrasonic welding joint 10 is formed between the inner conductor 1 and the Cu braid 4, said ultrasonic welding joint 10 mechanically and electrically connecting the inner conductor 1 with the Cu braid 4.

Figure 3:
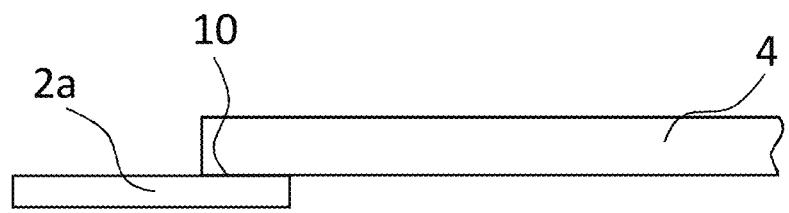

FIG. 3 shows a detailed view of the connection between the first connection element 4 (Cu braid 4) and the inner field grading layer 2a in a side view. Also here, an ultrasonic welding joint 10 is formed between the field grading layer 2a and the Cu braid 4 which mechanically and electrically connects the field grading layer 2a and the Cu braid 4 with each other.

Figure 4:
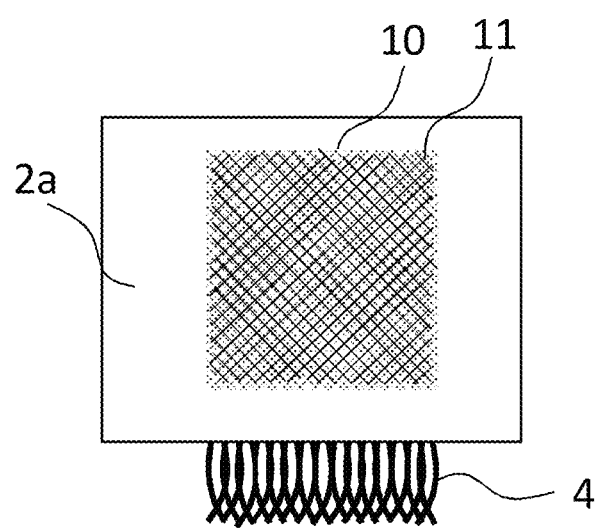

FIG. 4 shows the same elements as FIG. 3 but now in top view onto the field grading layer 2a. The ultrasonic welding joint 10 is indicated by the dotted area but is actually hidden behind the field grading layer 2a. In the area of the ultrasonic welding joint 10 and at the side facing away from the ultrasonic welding joint 10, the field grading layer 2a comprises a knurl structure 11 imprinted into the field grading layer 2a. This structure 11 is a trace of a structure of a welding tool used for pressing the field grading layer 2a and the Cu braid 4 together during ultrasonic welding.

Figure 5:
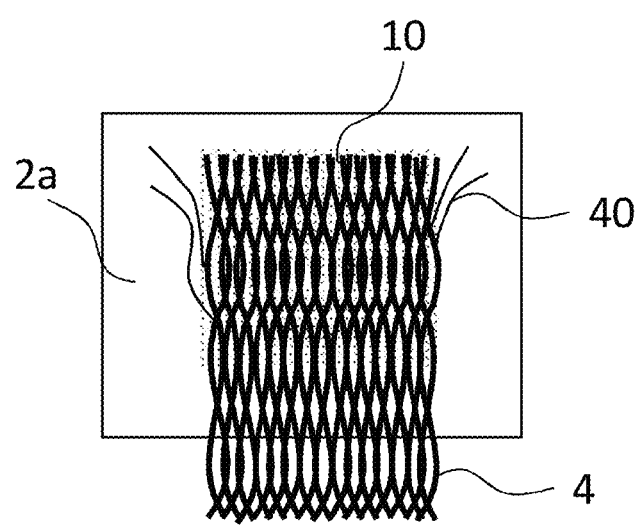

FIG. 5 shows the same elements as FIG. 4 but now in top view onto the Cu braid 4 so that the ultrasonic welding joint 10 is hidden behind the Cu braid 4. As can be seen in FIG. 5, some of the threads 40 of the Cu braid 4 project from the section of the Cu braid 4 which is ultrasonically welded to the field grading layer 2a. These threads 40 are not ultrasonically welded to the field grading layer 2a, which turned out to negatively impair the impedance of the ultrasonic welding joint 10.

Figure 6:
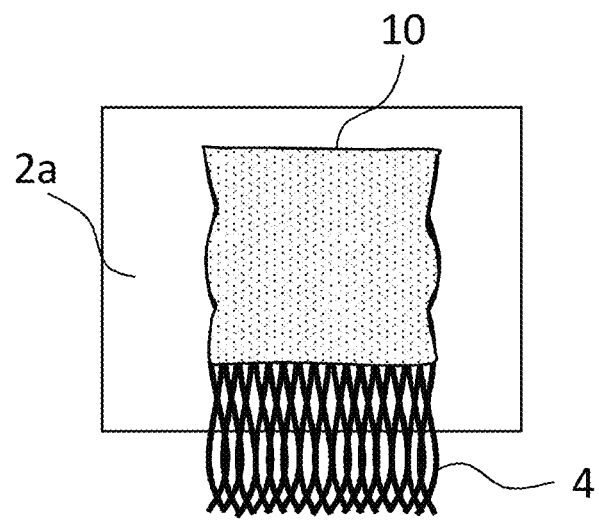

In order to avoid such projecting threads 40, the section of the Cu braid 4 to be ultrasonically welded may be solidified before, e.g. by resistance welding, so that the threads 40 are fused together. Such a solidified section is shown in FIG. 6, where individual threads 40 are no longer present in the section of the Cu braid 4 which is ultrasonically welded to the field grading layer 2a.

Figure 7:
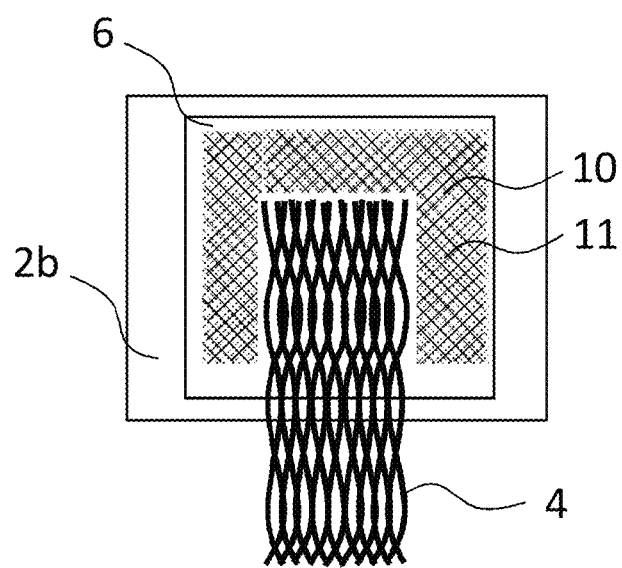

FIG. 7 shows a detailed view of the connection of the third connection element 4, 6 to the intermediate field grading layer 2b. In this case, the third connection element 4, 6 comprises a round Cu braid 4 and a Cu foil 6. The Cu braid 4 is, for example, soldered to the Cu foil 6. The Cu foil 6 is mechanically and electrically connected to the intermediate field grading layer 2b by means of an ultrasonic welding joint 10. The Cu foil 6 comprises an imprinted knurl structure 11 resulting from the welding tool in the region of the ultrasonic welding joint 10.

Figure 8:
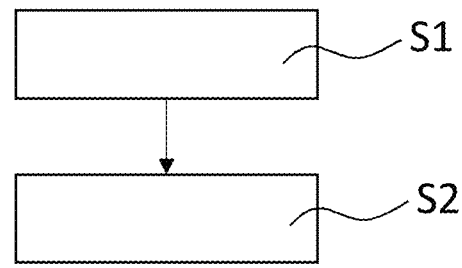
FIG. 8 shows a flowchart of an exemplary embodiment of the method for producing a bushing.

FIG. 8 shows a flowchart of an exemplary embodiment of the method for producing a bushing. In a step S1, electrically conductive elements, like an inner conductor and a metal foil for forming the field grading layers, are provided. In a step S2, one of the conductive elements is ultrasonically welded to another one of the conductive elements.

Figure 9:
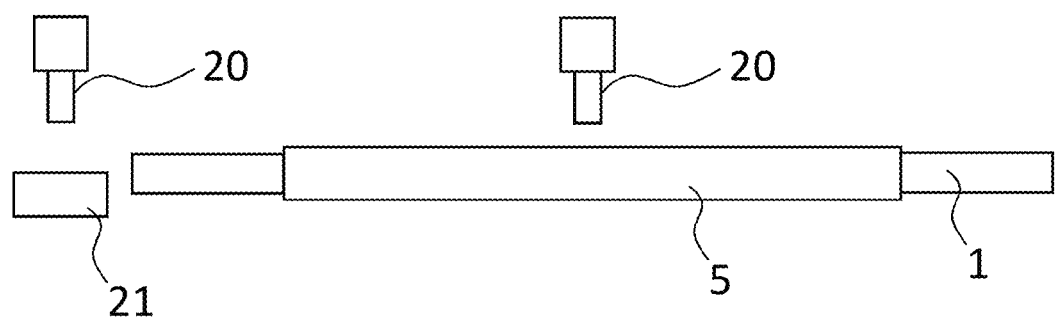
FIGS. 9 and 10 show different positions in an exemplary embodiment of the method for producing a bushing.

FIG. 9 shows a position in an exemplary embodiment of the method for producing a bushing. In this figure, an elongated inner conductor 1, which is, for example, a Cu rod, is provided. The inner conductor 1 is radially surrounded by an electrically isolating material 5. For example, the inner conductor 1 is clamped in a winder arrangement, in which an electrically isolating tape 5 is wound around the inner conductor 1 (see also FIGS. 10 and 11).

The winder arrangement comprises an ultrasonic welding apparatus having welding tools 20, 21. The welding tools 20 are horns or sonotrodes, respectively, and the welding tool 21 is an anvil. Surfaces of the horns 20 and/or of the anvil 21 may comprise a structure which is imprinted into the elements which are ultrasonically welded together.

Figure 10:
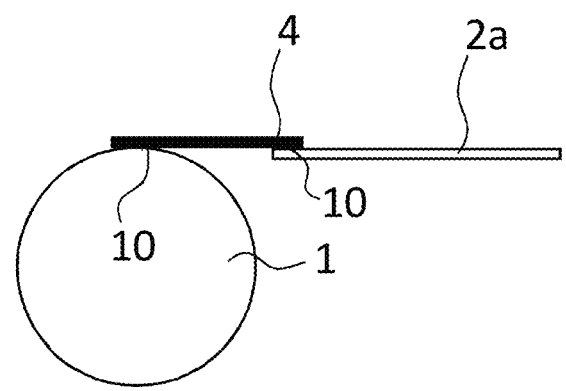

FIG. 10 shows a position of the method. The inner conductor 1 is shown in a cross-sectional view with the main extension axis of the inner conductor 1 being perpendicular to the paper plane.

In the position of FIG. 10, an end of a Cu braid 4 is ultrasonically welded to a portion of the inner conductor 1. The other end of the Cu braid 4 is ultrasonically welded to an Al foil 2a which will be later on wound around the inner conductor 1 in order to form an inner field grading layer of the bushing. The ultrasonic welding joints 10 between the Cu braid 4 and the inner conductor 1 or the Al foil 2a, respectively, are formed with the ultrasonic welding apparatus shown in FIG. 9.

The embodiments shown in the Figures as stated represent exemplary embodiments of the improved bushing and the improved method for producing a bushing; therefore, they do not constitute a complete list of all embodiments according to the improved bushing and method. Actual bushings and methods may vary from the embodiments shown in terms of arrangements, devices and materials for example.

REFERENCE SIGNS 1 inner conductor
2a . . . 2c field grading layers/metal foil
3 flange
4 Cu braid
5 electrically isolating material
6 Cu foil
7 voltage tap
10 ultrasonic welding joint
11 imprinted structure
20 horn/sonotrode
21 anvil
22 roller
40 thread
100 bushing
S1, S2 method steps

The invention claimed is:

1. A bushing comprising:
a plurality of electrically conductive elements,
at least one ultrasonic welding joint formed between and mechanically and electrically connecting one electrically conductive element and another electrically conductive element,
wherein the other conductive element is a metal braid, a section of the metal braid adjoining the ultrasonic welding joint is a solidified section in which the threads of the metal braid are connected to each other in a material locking manner.

2. The bushing according to claim 1, wherein
the bushing is a high voltage condenser bushing having an inner conductor for transporting current,
at least two field grading layers formed of an electrically conductive material and arranged around the inner conductor,
an electrically isolating material arranged between the at least two field grading layers and electrically isolating them from each other, wherein
the inner conductor and/or at least one field grading layer are mechanically and electrically connected to another electrically conductive element by means of at least one ultrasonic welding joint.

3. The bushing according to claim 2, wherein
the inner conductor is electrically connected to an inner field grading layer of the bushing via a first metal braid and an outer field grading layer of the bushing is electrically connected to a housing element of the bushing via a second metal braid,
the inner conductor is mechanically and electrically connected to the first metal braid by means of at least one ultrasonic welding joint,
the inner field grading layer is mechanically and electrically connected to the first metal braid by means of at least one ultrasonic welding joint,
the outer field grading layer is mechanically and electrically connected to the second metal braid by means of at least one ultrasonic welding joint,
the housing element is mechanically and electrically connected to the second metal braid by means of at least one ultrasonic welding joint.

4. The bushing according to claim 1, wherein
at least one ultrasonic welding joint is formed between and mechanically and electrically connects a conductive element made of Cu or Al and another conductive element made of Cu.

5. The bushing according to claim 1, wherein
at least one of the conductive elements which is mechanically and electrically connected to another conductive element by means of at least one ultrasonic welding joint is a metal foil.

6. The bushing according to claim 1, wherein at least one of the conductive elements which is mechanically and electrically connected to another conductive element by means of at least one ultrasonic welding joint comprises a structure imprinted into the conductive element.

7. The bushing according to claim 6, wherein the structure is a knurl structure.

8. A method for producing a bushing comprising:
providing electrically conductive elements,
ultrasonically welding one of the conductive elements to another one of the conductive elements, wherein
the other conductive element is a metal braid, wherein before the ultrasonic welding, a section of the metal braid to be ultrasonically welded is solidified by connecting the threads of the metal braid in this section in a material locking manner.

9. The method according to claim 8, wherein
for ultrasonically welding the conductive element to the other conductive element,
a welding tool is used which comprises a surface with a structure,
the conductive element and the other conductive element are pressed together with the help of the welding tool so that the structure of the surface is imprinted into at least one of the conductive element and the other conductive element.

* * * * *